United States Patent [19]

Gavaler et al.

[11] 3,912,612

[45] Oct. 14, 1975

[54] METHOD FOR MAKING THIN FILM SUPERCONDUCTORS

[75] Inventors: John R. Gavaler, Pittsburgh; John K. Hulm, Squirrel Hill; Michael A. Janocko; Clifford K. Jones, both of Pittsburgh, all of Pa.

[73] Assignee: Westinghouse Electric Corporation, Pittsburgh, Pa.

[22] Filed: Sept. 19, 1973

[21] Appl. No.: 398,902

Related U.S. Application Data

[63] Continuation-in-part of Ser. No. 271,884, July 14, 1972, abandoned, which is a continuation of Ser. No. 802,427, Feb. 26, 1969, abandoned.

[52] U.S. Cl. .................................. 204/192; 204/298

[51] Int. Cl. .................................. C23c 15/00

[58] Field of Search .................................. 204/192, 298

[56] References Cited

UNITED STATES PATENTS

| | | | |
|---|---|---|---|
| 3,242,006 | 3/1966 | Gerstenberg | 204/192 |
| 3,400,066 | 9/1968 | Caswell | 204/192 |

OTHER PUBLICATIONS

Gerstenberg et al., Journ. of Electrochem. Soc. III, No. 8, 1964, pp. 936–942.

Mitszuoka et al., Journal of Applied Physics 39, No. 10, 1968, pp. 4788–4791.

Sosniak et al., Journal of Applied Physics 38, No. 11, 1967, pp. 4390–4392.

Bell et al., Journal of Applied Physics 39, No. 6, 1968, pp. 2797–2803.

*Primary Examiner*—T. M. Tufariello

*Attorney, Agent, or Firm*—R. T. Randig

[57] ABSTRACT

A method of reproducibly making thin film superconductors of transition metal interstitial compounds, for example, niobium nitride (NbN), having an optimum transition temperature ($T_c$) of at least about 15°K to 16°K, the method comprising the steps of reactively depositing on a substrate the compounds by sputtering techniques in a system which is initially decontaminated by heating to about 400°C while at a pressure of about $5 \times 10^{-10}$ Torr, the deposition of the metal compound being carried out in an atmosphere of nitrogen and/or a hydrocarbon gas while the substrate is at a temperature of about 450°C to about 1000°C.

9 Claims, 4 Drawing Figures

METHOD FOR MAKING THIN FILM SUPERCONDUCTORS

The present application is a continuation in part of application Ser. No. 271,884 filed July 14, 1972, now abandoned which in turn was a continuation of application Ser. No. 802,427, filed Feb. 26, 1969 now abandoned.

The invention described herein was made in the performance of work under a NASA contract identified as NASW—1647 and is subject to the provisions of Section 305 of the National Aeronautics and Space Act of 1958. Public Law 85-568 (72 Stat. 435; 42 USC 2457).

BACKGROUND OF THE INVENTION

1. Field of the Invention

This invention relates to a method of consistently and reproducibly making a thin film superconductor having a transition temperature of about 15°K or higher.

2. Description of the Prior Art

Superconductors are electrical conductors capable of sustaining a current without electrical loss at cryogenic temperatures. The amount of current they can carry without loss is a complicated function of the temperature, the magnetic field, the type of superconductor, and its metallurgical history.

The phenomenon of superconductive tunneling has many potentially important device applications. Among others these include the construction of superconducting computer elements, and microwave radiation detectors and generators. The temperatures at which the devices are operable are determined by the transition ($T_c$) of the superconducting components. Presently, the usefulness of these devices is limited to the liquid helium temperature range (less than about 4.2°K). Although there are superconducting compounds which have bulk transition temperatures which extend into the liquid hydrogen range (less than about 13.6°K), none of these has been successfully prepared in thin film for with a $T_c$ high enough for use at temperatures of 13.6°K or higher in a quantum effect device with integrated circuit compatibility.

More particularly, the usefulness of known thin film superconductors has been limited to temperature ranges of less than about 13°K for which only liquid helium can be used. The disadvantage of using liquid helium is that not only is it more costly than hydrogen, but more expensive equipment is required to maintain the lower temperature conditions. It is therefore highly desirable to provide thin film superconductors having transition temperatures which extend into the liquid hydrogen range in order to operate at a reduced cost and with less complicated equipment for maintaining the temperature. While liquid hydrogen has a boiling point of about 20.3°K at atmospheric pressure, by simple pumping to provide a reduced gas pressure, liquid hydrogen will boil at about 15°K.

Associated with the aforegoing has been the problem of developing a technique by which relatively high transition temperatures for transition metal interstitial compounds can be prepared in thin film form with transition temperatures similar to those of the bulk-type superconductors. Although the bulk-type superconductor has been provided for operation in the desired temperature range for use with liquid hydrogen, the bulk-type superconductor has limited applicability as compared with the thin film superconductor.

In addition, the magnetic field and current carrying properties of these films are greatly superior to the bulk values for which reason the former have applications other than in quantum devices. Among the many possible transition metal interstitial compounds available, niobium nitride (NbN) has been investigated extensively. The interstitial compound NbN has been prepared in bulk form by many investigators by high temperature diffusion of nitrogen into niobium. An optimum transition temperature of about 16°K is obtained in a compound in bulk form with slightly less than the stoichiometric concentration of nitrogen as reported by G. Horn and E. Saur, Zeit. fur Physik 210, 70 (1968). Stoichiometric NbN is reported to have a transition temperature of between 15°K and 16°K in bulk form. An effort to make thin films of NbN by reactively sputtering niobium in an argon-nitrogen atmosphere resulted in films having superconducting properties at approximately 6°–9°K as reported by D. Gerstenberg and P. M. Hall, J. Electrochem. Soc 111, No. 8 (1964). In addition, attempts to reactively sputter niobium nitride and other related compounds were made in an ultrahigh vacuum chamber where the background pressure was reduced to less than about $5 \times 10^{-9}$ Torr by depositing NbN films on a substrate at a temperature of 450°C resulted in transition temperatures of about 12°K. Similar depositions with some related compounds produced a maximum transition temperature of about 13.5°K, as reported by H. Bell, Y. M. Shy, D. E. Anderson and L. E. Toth, J. Appl. Phys. 39, No. 6 (1968).

Additional attempts to provide NbN films resulted in films having a transition temperature of about 12°K with some films having a transition temperature of up to about 15°K as reported by T. Mitszuoka, T. Yamashita, T. Nakazawa, Y. Onodera, Y. Saito and T. Anayama, J. Appl. Phys. 39, No. 10 (September 1968). Apparently only one NbN film was produced having a transition temperature of approximately 15°K. However, our invention was conceived and reduced to practice prior to the date of this publication.

Summarizing, only materials in bulk form with relatively high transition temperatures of greater than about 13.5°K have been controllably and reproducibly prepared rather than thin films thereof. Techniques have not been developed heretofore for providing consistently and reproducibly thin film superconductors having transition temperatures of at least 15°K to 16°K, whereby liquid hydrogen rather than liquid helium may be used for maintaining their temperature.

SUMMARY OF THE INVENTION

It has been found in accordance with this invention that very high purity thin film superconductors of the transtion metal interstitial compounds may be produced reproducibly by reactively sputtering. This has been exemplified by reactively sputtering niobium nitride on a substrate having a temperature of about 500°C ± 25°C, the exact temperature depending upon the deposition rate in an inert gas and nitrogen atmosphere with the nitrogen having a partial pressure from about $5 \times 10^{-5}$ Torr to $1 \times 10^{-4}$ Torr, and in a deposition environment in which the background residual gas pressure is $5 \times 10^{-10}$ Torr or lower. Under these conditions contaminants detrimental to the thin film properties are eliminated.

There exists several important parameters in the sputtering process which may be varied over given ranges without significantly adversely affecting the $T_c$ of the deposited film. These parameters include cathode voltage, current density, cathode-substrate spacing, substrate temperture, sputtering gas total pressure, nitrogen pressure, and argon nitrogen ratio. Of course, the critical parameters remain a nearly contamination free environment and control of the reaction gas to provide the desired stoichiometry.

BRIEF DESCRIPTION OF THE DRAWINGS

For a brief understanding of the nature and objects of this invention, reference is made to the drawings, in which similar numerals referred to similar parts throughout the several views of the drawings, and in which.

DESCRIPTION OF THE PREFERRED EMBODIMENT

According to the present invention the new method is carried out in the following sequence, using the deposition of NbN for example:

1. Evacuating the enclosed system comprising a niobium cathode and a substrate to as low a base pressure as possible such as $5 \times 10^{-10}$ Torr or lower to remove residual gases as contaminants;

2. Baking the cathode and anode internal surfaces of system at about 400°C for about 16 hours during evacuation;

3. Introducing pure nitrogen gas into the system to raise the pressure to about $6 \times 10^{-5}$ Torr;

4. Introducing enough pure inert gas (argon or helium) to enable the initiation of sputtering, i.e. to start glow discharge, whereby the resulting pressure (including nitrogen and inert gas) is about $1 \times 10^{-2}$ Torr;

5. Applying a potential to the niobium cathode of about 1,600 to 2,000 volts at a current of about 0.8 to 1 ma/cm² with a separation of ⅜ inch to ½ inch between the cathode and the substrate while heating the substrate to 500°C ± 25°C; and 6. Sputtering at a rate of 300 A/minute for about 5 to 10 minutes to provide a film thickness of 1500 to 3000 A.

The foregoing conditions may be provided in any suitable chamber susceptible to the maintenance of such pressures.

Figures 1, 3:
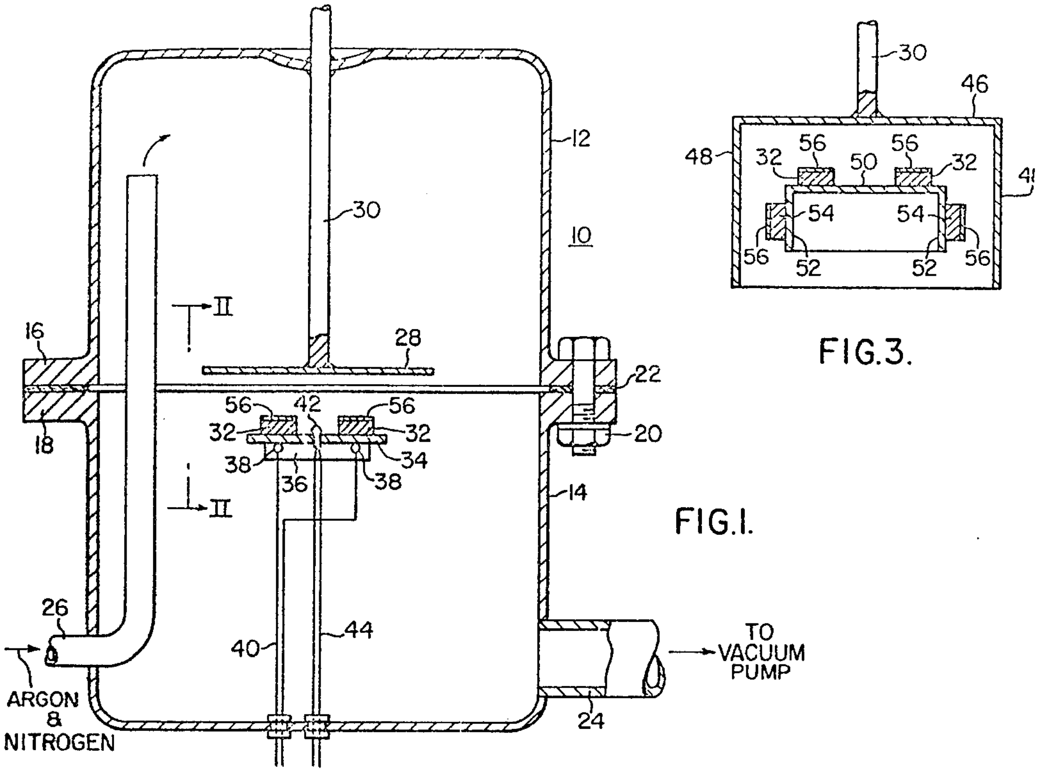
FIG. 1 is a vertical sectional view of a sputtering chamber in which substrates mounted on a platform are positioned for application of thin surface films of the superconductor.
FIG. 3. is a fragmentary sectional view of another embodiment of the cathode.

One embodiment of a sputtering chamber is generally indicated at 10 in FIG. 1. The chamber 10 comprises an upper portion 12 and a lower portion 14, which portions are provided with mating radial flanges 16 and 18 for securing the portions together by means of nut and bolt assemblies 20, and a gasket 22 is disposed between the flanges.

The lower portion 14 includes gas outlet vent 24 which leads to a vacuum pump means. An inlet conduit 26 for the introduction of nitrogen, or a hydrocarbon gas or both, and an inert gas such as argon is provided in the lower portion 14. The conduit 26 extends into the upper portion 12 to a location remote from the outlet vent 24.

A source of a transition metal is provided by a plate or sheet cathode 28 which is mounted on the lower end of an electrically conductive cathode support rod 30, the upper end of which extends through the top of the upper portion 12 in a fluid-tight manner. When in use the cathode 28 is operated at a potential of from 500 to 5,000 volts and preferably being at approximately 1,700 volts for forming thin films of NbN, which is applied through rod 30.

Figure 2:
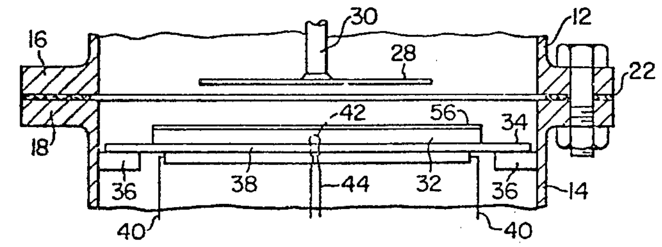
FIG. 2 is a fragmentary vertical sectional view taken on the line II–II of FIG. 1.

Below the cathode 28 means are provided for supporting one or more substrates 32, including a shelf 34 and a pair of shelf mounting lugs 36 (FIG. 2) which lugs are secured preferably at diagonally opposite portions of the interior surface of the lower portion 14. Means for heating and controlling the temperature of the substrate 32 include at least one heating coil 38 which is attached to the undersurface of the shelf 34 and which is provided with lead wires 40 extending to the exterior through a suitable hermetic seal in the lower portion 14 of the container. A thermocouple 42 is preferably provided on the upper surface of the shelf 34 and lead wires 44 therefore extend to the exterior through a suitable hermetic seal in the lower portion 14 of the container.

Another embodiment of the cathode and substrate assembly arrangement is shown in FIG. 3. A cathode 46 is mounted at the lower end of the rod 30. The cathode 46 may be of circular configuration but may be square, hexagonal, or have any other desirable shape. As shown in FIG. 3 a peripheral flange 48 is attached to and extends downwardly from the edge of the cathode 46 to a point below the substrate 32. A shelf 50 is disposed similarly to the shelf 34 and is provided with down turn flanges 52. This construction provides more substrate-mounting area and substrates 54 may be mounted on the flange 52. This arrangement increases the efficiency of the operation and in particular prevents line-of-sight impingment of impurities on the substrate. In operation, the flange 48 minimizes the scatter of niobium particles emanating from the cathode 46 and flange 48 and provides for a greater concentration of ionized niobium nitride film adjacent the substrates 32 and 54, whereby to enable a given thickness of niobium nitride film 56 to be applied per minute.

Thin films such as that of niobium nitride are made by sputtering niobium nitride onto the surface of the substrate. The substrate is preferably located from about 0.5 cm. to about 10 cm. from the cathode surface nearest thereto. The thickness of a thin film of this invention is generally a few thousand angstroms but may be substantially thicker. To produce such films of high $T_c$ temperatures, the cathode 28 which is the source of the niobium is charged through a potential of 500 to 5,000 volts and preferably between about 1,000 to 3,000 volts. In a specific example approximately 1,700 volts was used, which also develops considerable heat within the chamber between the cathode and the substrate 32. Additional heat, if needed, is provided by the heating coil 38 and the temperature of the critical zone of the substrate 32 is monitored by suitable means such as a thermocouple 42. Where the voltage is less than 500 volts, the deposition rate is slower and probability of contamination increases. At over 5,000 volts the substrate may be heated too high and also increases contamination of the film.

An inert atmosphere such as argon or helium is provided at a background pressure of from approximately $10^{-1}$ to $10^{-2}$ Torr to facilitate and maintain sputtering. Before the argon is introduced however the entire chamber 10 is evacuated to a pressure of $5 \times 10^{-10}$ Torr or lower in order to eliminate a source of contaminants within the chamber. This evacuation process includes a bakeout at about 400°C for 16 hours or its equivalent. Higher baking temperatures such as up to 525°C may be used for correspondingly less time periods. Lower baking temperatures such as 350°C requires more time. Thereafter the indicated amount of inert gas such as argon is added because sputtering of niobium from the cathode onto the substrate would not otherwise proceed at the lower pressure of the nitrogen gas alone. It has been found however that the total sputtering gas pressure should be maintained within the range between 10 microns and about 400 microns and the nitrogen pressure can be maintained within the range between 100 and 400 microns depending upon the substrate temperature. Moreover, the ratio of reactive gas to inert gas may vary from pure reactive gas to a 20 to 1 ratio of inert gas to reactive gas. Of course, the other parameters must be accordingly, adjusted.

In addition to the inert gas, nitrogen or a hydrocarbon gas or both may be added. At a temperature of about 500°C ± 25°C the nitrogen reacts with the niobium particles dislodged from the cathode to form stoichiometric niobium nitride which deposits on the substrate and comprises the thin film thereon. Films 56 of any suitable thickness may be formed by the proper sputtering time. Under the sputtering conditions indicated above, the film deposits at the rate of 300 A per minute. During deposition the partial pressure of nitrogen is maintained in the range of from about $5 \times 10^{-5}$ Torr to about $1 \times 10^{-4}$ Torr. It has been found that in this narrow pressure range the optimum $T_c$ properties of the film of niobium nitride are obtained consistently and controllably. If insufficient or excess nitrogen is present in the atmosphere the transition temperature and other superconducting properties are undesirably reduced. Thus the indicated narrow pressure range of nitrogen must be maintained during sputtering in order to form NbN with optimum superconducting properties. Further, if nitrogen is used alone without an inert gas such as argon, the electrical discharge will not occur and sputtering will not take place unless the total nitrogen pressure is increased to the range between about 100 microns and 400 microns and the substrate is heated to a temperature in excess of 700°C.

Where the cathode-substrate spacing is maintained near the lower position of the range, that is from about 0.5 cm. to about 1.5 cm. higher pressures of reaction gas can be maintained. It has been found that nitrogen pressures of up to about 400 microns without the use of an inert gas partial pressure can be employed if the substrate is heated to a temperature within the range between about 450°C and about 1000°C. By maintaining the closer spacing, higher pressures and higher temperatures, it is believed that a shorter mean free path is obtained thereby fastening a more nearly desired stoichiometry on an atomic basis for the thin film being formed.

A gaseous source of carbon such as a hydrocarbon gas for example methane can be substituted in whole or part for the pure nitrogen.

The following examples are illustrative of the invention:

EXAMPLE I

Using an apparatus such as illustrated in FIG. 1 with a 0.015 inch thick, high purity cathode, 6 × 8 centimeters, about ⅜ inch above 1/2 inch × 1/8 inch quartz substrate members, a high efficiency vacuum pump including a liquid nitrogen trapped oil diffusion pump was operated to reduce the background pressure to $5 \times 10^{-10}$ Torr or less while the assembly was heated to 400°C for 16 hours. Thereafter nitrogen with less than 1 ppm impurities was leaked into the systems until a pressure of $6 \times 10^{-5}$ Torr was obtained. Argon gas with less than 1 ppm impurities was then introduced into the apparatus to a pressure of $5 \times 10^{-2}$ Torr. A potential of 1,700 volts was applied to the niobium cathode while the substrate support made the anode, and a total of 80 ma of current was applied. At this current the niobium cathode was bombarded at approximately 1 $ma/cm^2$. The substrate was heated to 500°C ± 25°C. Under these conditions the sputtering rate was approximately 5 A/sec onto the substrate-target. In 5 minutes a film of NbN was deposited on the substrate to a thickness of 1,500 Angstroms.

The NbN films produced on the substrate were superconducting and all had $T_c$ temperatures of between 15°K and 16°K. These films exhibited a f.c.c. rocksalt structure with a lattice parameter of 4.39 A.

At a pressure of the nitrogen in Example I the sputtering does not commence until sufficient inert gas such as argon is introduced into the system with the nitrogen to enable sputtering to occur at about 1,700 volts. Maintenance of the critical pressure of nitrogen in the system is necessary since the nitrogen gas is continually being selectively pumped out of the gas space by the gettering action of the niobium.

In order to prepare, by reactive sputtering, films with the desired properties, the proper reaction temperature must be achieved at the substrate. The temperature may vary slightly depending upon the material being sputtered. The optimum reaction temperature for the formation of stoichiometric NbN is 500°C ± 25°C.

As an indication of the criticality of the sputtering conditions, when the sputtering voltage was 1,000 and the current was 0.5 $ma/cm^2$, while the substrate temperature was 250°C, the deposition rate of NbN was about 1 A per second, the $T_c$ of the resulting films was less than 8°K. Niobium sputtered on pure nitrogen alone had a $T_c$ of about 12°K.

EXAMPLE II

In a manner similar to Example I, a cathode comprising niobium was disposed ⅜ inch from stainless steel substrates. After baking out at $5 \times 10^{-10}$ Torr at 400°C for 16 hours, the chamber had a mixture 3 volumes of pure nitrogen gas and one volume of pure methane leaked into a pressure of about $5 \times 10^{-5}$. Argon was then added to bring the total pressure up to about $5 \times 10^{-2}$ Torr. When potential at 1,700 volts and a current density of about 1 $ma/cm^2$ of cathode was applied while the substrate was at about 500°C, a niobium carbonitride film was deposited on the substrate to a thickness of 1000 A. The film was found to have a $T_c$ of 15.5°K.

EXAMPLE III

Using a cathode of niobium-titanium alloy (25% Ti), a stainless steel substrate was coated with a NbTiN film following the procedure of Example I. Good superconducting films were produced.

EXAMPLE IV

A zirconium target consisting of a piece of zirconium sheet 0.010 inch in thickness was placed in the reactor and spaced 1 inch from the substrate. The reactor was then evacuated to a pressure of $5 \times 10^{-10}$ Torr and the contents of the reactor were heated to a temperature of 400°C and held at this temperature for a period of 12 hours. Thereafter, pure $N_2$ was admitted to the reactor until the pressure within the reactor was 300 microns. As thus pressurized, the substrate was heated to 700°C the voltage adjusted to 1700 volts with a corresponding current density of 70 milliampere. Sputtering was initial and continuted for a period of 3 hours thereby resulting in a deposited film having a thickness of about 3.6 microns. This film was thereafter tested and it exhibited a $T_c$ of the bulk material.

Using hydrocarbon gases in the apparatus of FIG. 1, cathodes of zirconium, titanium, and niobium, can be employed to deposit the superconducting carbides of these elements with $T_c$ temperatures approaching the $T_c$ values for the bulk materials.

The substrates coated with the superconducting films of Examples I and II and in circuit with quantum effect integrated circuit devices, can be placed in a bath of liquid hydrogen, and upon pumping the bath to provide a temperature of about 15°K or lower at the devices, the devices will operate satisfactorily.

By reactive sputtering and use of techniques based on the foregoing considerations NbN films having superior superconducting properties have been regularly and consistently produced reproducibly. The transition temperature of the NbN films is between 15°K and 16°K, which is comparable to stoichiometric bulk NbN.

Accordingly, NbN and other superconducting compound films have been prepared by reactive sputtering wherein niobium is sputtered in the presence of nitrogen or hydrocarbon gas. The critical factors of the process which enable the deposition of films with superior superconducting properties and high $T_c$ values approaching those of the bulk material in a reproducible manner are disclosed. More specifically, inasmuch as even trace amounts of residual gases which are present in an ordinarily high vacuum ($10^{-7}$ to $10^{-6}$ Torr) environment severely contaminate and depress the superconducting properties of the film, it has been found that contamination must be minimized by the use of the specified ultra-high vacuum techniques, and the use of the high temperature substrates. Other methods such as bias sputtering or getter sputtering may also be useful in this regard.

Figure 4:
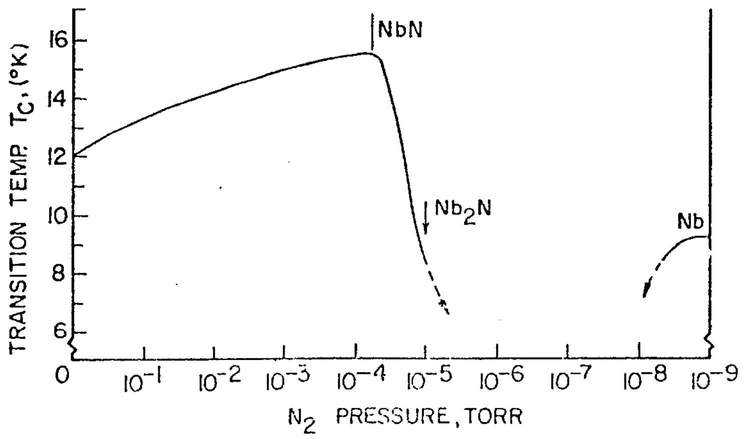
FIG. 4 is a graph of the transition temperature. ($T_c$), in degrees K versus nitrogen pressure, Torr for NbN films.

In accordance with this invention it has been found that the niobium nitride compound with the highest $T_c$ temperature results only in a narrow nitrogen pressure range. As shown in FIG. 4 the decrease in the pressure of nitrogen in the sputtering chambers increases the transition temperature, $T_c$ up to a maximum of about 15.5°K at a pressure of between $1 \times 10^{-4}$ and $5 \times 10^{-5}$ Torr. At that pressure and temperature stoichiometric NbN is deposited in film form. Thereafter with decreasing nitrogen pressure it is evident that the stoichiometric NbN is not formed, and there is a corresponding decrease in the transition temperature of the niobium nitride so produced.

However, if the other parameters are suitably changed, that is the cathode substrate spacing, substrate temperature, cathode voltage and current density, the nitrogen pressure may be increased to about 300 microns, the argon eliminated and the film so deposited will exhibit the same high $T_c$ temperature. Thus FIG. 4 only to the conditions set forth in Example I.

In addition to the transition temperatures of the NbN films other properties have been measured. The critical field of the NbN films of this invention at 4.2°K is over 210 kilogauss by direct measurement, and is estimated to be 250 kilogauss. The critical current at 4.2°K in a 100 kilogauss field is $5 \times 10^5$ A/cm$^2$ and in a 200 kilogauss field is $4 \times 10^4$ A/cm$^2$. Both the critical field and the critical currents are significantly higher than ever found previously in NbN, either in bulk or in thin film form. These values thus make the NbN films useful as a magnet material.

Though the foregoing description has emphasized NbN films, it is understood that films of the nitride, carbides and carbonitrides other transition metals such as Ti, Zr, and combination of two or more thereof may be prepared and used with substantially the same or slightly altered parameters of operation. The carbonaceous gases can be compounds of carbon and hydrogen with nitrogen also permissibly being present. Also numerous substrates such as glasses, ceramics and metals may be employed.

We claim:

1. A method for reproducibly depositing on a substrate superconductive thin films of transitional metal compounds comprising the steps of placing within a hermetically sealed container at least one transitional metal selected from the group consisting of niobium, titanium, and zirconium, in a position proximate to the substrate, evacuating the container to a pressure of about $5 \times 10^{-10}$ Torr and heating for a period of time to decontaminate the metal source and the substrate, introducing at least one reactive gas selected from the group consisting of nitrogen and hydrocarbon gases into the container to a pressure of about $5 \times 10^{-5}$ to $10^{-4}$ Torr, also introducing into the container a sufficient amount of an inert gas to produce a total pressure of about $10^{-1}$ to $10^{-2}$ Torr whereby sputtering of the transition metal source can occur, applying a voltage of between about 1000 to about 3000 volts to the transitional metal source as a cathode, and a current of about 0.8 to about 1 milliampere per square centimeter of cathode surface and heating the substrate to a temperature of about 500°C ± 25°C whereby the transitional metal is sputtered from the source, combines with the reactive gas to form the desired superconducting compound which is deposited as a thin film on the substrate.

2. The process of claim 1 wherein the reactive gas pressure is about $6 \times 10^{-5}$ Torr.

3. The process of claim 1 wherein the reactive gas is nitrogen.

4. The process of claim 1 wherein the inert gas is argon.

5. The process of claim 1 wherein the source of transition metal is niobium, the reactive gas is nitrogen, and the voltage applied is about 1700 to 2000 volts.

6. A method for reproducibly depositing on a substrate superconductive thin films of transitional metal compounds comprising the steps of placing within a hermetically sealed container at least one transitional metal selected from the group consisting of niobium, titanium, and zirconium, and a substrate, the spacing between the metal and the substrate being within the range between about 0.5 cm. and about 10 cm. evacuating the container to a pressure of about $5 \times 10^{-10}$ Torr and heating for a period of time to decontaminate the metal source and the substrate, introducing a reactive gas selected from the group consisting of nitrogen and hydrocarbon gases into the container to a pressure of up to 400 microns applying a voltage of between about 500V to about 5000 volts to the transitional metal source as a cathode, and a current of about 0.5 to about 10 milliamps per square centimeter of cathode surface and heating the substrate to a temperature within the range between about 450°C and about 1000°C whereby the transitional metal is sputtered from the source, combines with the reactive gas to form the desired superconducting compound which is deposited as a thin film on the substrate.

7. The process of claim 6 wherein the reactive gas is nitrogen.

8. A method for reproducibly depositing on a substrate superconductive thin films of transitional metal compounds comprising the steps of placing within a hermetically sealed container at least one transitional metal selected from the group consisting of niobium, titanium, and zirconium, and a substrate, the spacing between the metal and the substrate being within the range between about 0.5 cm. and about 10 cm. evacuating the container to a pressure of about $5 \times 10^{-10}$ Torr and heating for a period of time to decontaminate the metal source and the substrate, introducing at least one reactive gas selected from the group consisting of nitrogen and hydrocarbon gases into the container and also introducing into the container an inert gas to produce a total sputtering gas pressure of between about 10 and about 400 microns, the ratio of reactive gas to inert gas varying between pure reactive gas to 20 to 1 inert gas to reactive gas, applying to voltage of between about 500V to about 5000 volts to the transitional metal source as a cathode, and a current of about 0.5 to about 10 milliamps per square centimeters of cathode surface and heating the substrate to a temperature within the range between about 450°C and about 1000°C whereby the transitional metal is sputtered from the source, combines with the reactive gas to form the desired superconducting compound which is deposited as a thin film on the substrate.

9. The process of claim 8 wherein the reactive gas is nitrogen.

* * * * *